United States Patent
Yang

(10) Patent No.: US 12,331,639 B2
(45) Date of Patent: Jun. 17, 2025

(54) SYSTEM AND METHOD FOR MINIMIZING ENVIRONMENTAL NOISES ON ACOUSTIC SIGNALS

(71) Applicant: SAUDI ARABIAN OIL COMPANY, Dhahran (SA)

(72) Inventor: Yunlai Yang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 260 days.

(21) Appl. No.: 18/058,170

(22) Filed: Nov. 22, 2022

(65) Prior Publication Data

US 2024/0167339 A1 May 23, 2024

(51) Int. Cl.
| | | |
|---|---|---|
| G01V 1/52 | (2006.01) | |
| E21B 7/04 | (2006.01) | |
| E21B 47/14 | (2006.01) | |
| G01V 1/44 | (2006.01) | |

(52) U.S. Cl.
CPC ............... *E21B 7/04* (2013.01); *E21B 47/14* (2013.01); *G01V 1/44* (2013.01); *G01V 1/523* (2013.01); *G01V 2210/30* (2013.01)

(58) Field of Classification Search
CPC .. E21B 7/04; E21B 47/14; G01V 1/44; G01V 1/523; G01V 2210/30
See application file for complete search history.

(56) References Cited

U.S. PATENT DOCUMENTS

| | | | |
|---|---|---|---|
| 6,837,332 B1 * | 1/2005 | Rodney | G01V 1/48 73/152.01 |
| 7,404,456 B2 | 7/2008 | Weaver et al. | |
| 9,234,974 B2 | 1/2016 | Yang | |
| 9,903,974 B2 | 2/2018 | Yang | |
| 11,466,517 B2 * | 10/2022 | Donderici | E21B 47/13 |
| 2013/0080060 A1 | 3/2013 | Yang | |
| 2017/0058669 A1 | 3/2017 | Lakings et al. | |
| 2018/0128102 A1 * | 5/2018 | Torres-Verdin | E21B 47/12 |
| 2020/0124758 A1 | 4/2020 | Li | |
| 2021/0389492 A1 | 12/2021 | Yang et al. | |

FOREIGN PATENT DOCUMENTS

| | | | | |
|---|---|---|---|---|
| WO | WO-03036042 A1 * | 5/2003 | | E21B 47/02208 |

\* cited by examiner

*Primary Examiner* — Krystine E Breier
(74) *Attorney, Agent, or Firm* — Osha Bergman Watanabe & Burton LLP

(57) ABSTRACT

A system includes an acoustic attenuation interface disposed between a first acoustic transmission conduit and a second acoustic transmission conduit. An acoustic signal source acoustically coupled to the first acoustic transmission conduit generates an acoustic signal. An acoustic noise source acoustically coupled to the second acoustic transmission conduit generates an acoustic noise. A first sensor is configured to detect a first composite signal including the acoustic signal after transmission through at least a portion of the first acoustic transmission conduit and an attenuated acoustic noise. A second sensor is configured to detect a second composite signal including the acoustic signal after transmission through at least a portion of the first acoustic transmission conduit and attenuated by the acoustic attenuation interface and the acoustic noise. An acoustic signal processing system is configured to determine a noise-reduced signal from the first composite signal and the second composite signal.

18 Claims, 11 Drawing Sheets

SYSTEM AND METHOD FOR MINIMIZING ENVIRONMENTAL NOISES ON ACOUSTIC SIGNALS

BACKGROUND

In the oil and gas industry, a number of logging-while-drilling (LWD) techniques are used to obtain information about a formation surrounding a wellbore such as lithology, resistivity, etc. Such information plays an important role in determining the presence and location of hydrocarbon reservoirs, and in planning where to drill oil and gas wells. Some LWD tools, such as acoustic signal processing, have the advantage to provide information on the properties of the geomaterials surrounding the wellbore in real time, during drilling operations.

However, the acoustic signals recorded during drilling operations inevitably contain not only the targeted signals, but also unwanted environmental noise. Processing acoustic signals with a high content of environmental noise introduces large uncertainties in the determination of the lithological properties of the site. Therefore, it is desirable to reduce in real time the intensity of environmental noise in an acoustic signal, so that errors can be minimized before extracting lithological information from the acoustic signal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system, including an acoustic attenuation interface disposed between a first acoustic transmission conduit and a second acoustic transmission conduit. The system further includes an acoustic signal source that generates an acoustic signal, acoustically coupled to the first acoustic transmission conduit, and an acoustic noise source that generates an acoustic noise, acoustically coupled to the second acoustic transmission conduit. The system still further includes a first sensor coupled to the first acoustic transmission conduit, wherein the first sensor is configured to detect a first composite signal including the acoustic signal after transmission through at least a portion of the first acoustic transmission conduit and an attenuated acoustic noise including the acoustic noise after transmission through at least a portion of the second acoustic transmission conduit and attenuated by the acoustic attenuation interface. The system also includes a second sensor coupled to the second acoustic transmission conduit, wherein the second sensor is configured to detect a second composite signal including the acoustic signal after transmission through at least a portion of the first acoustic transmission conduit and attenuated by the acoustic attenuation interface and the acoustic noise after transmission through at least a portion of the second acoustic transmission conduit. The system further includes and an acoustic signal processing system, in communication with the first sensor and the second sensor, configured to determine a noise-reduced signal from the first composite signal and the second composite signal.

In general, in one aspect, embodiments disclosed herein relate to a method, including transmitting, via a first acoustic transmission conduit, an acoustic signal generated by an acoustic signal source; and transmitting, via a second acoustic transmission conduit, an acoustic noise generated by an acoustic noise source. The method further includes attenuating, by an acoustic attenuation interface disposed between the first acoustic transmission conduit and the second acoustic transmission conduit: the acoustic signal propagating from the first acoustic transmission conduit to the second acoustic transmission conduit to produce an attenuated acoustic signal, and the acoustic noise propagating from the second acoustic transmission conduit to the first acoustic transmission conduit to produce an attenuated acoustic noise. The method also includes detecting a first composite signal, using a first sensor coupled to the first acoustic transmission conduit, wherein the first composite signal comprises the acoustic signal and the attenuated acoustic noise. The method further includes detecting a second composite signal, using a second sensor coupled to the second acoustic transmission conduit, wherein the second composite signal comprises the acoustic noise and the attenuated acoustic signal. The method still further includes and determining, using an acoustic signal processing system in communication with the first sensor and the second sensor, a noise-reduced signal from the first composite signal and the second composite signal.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
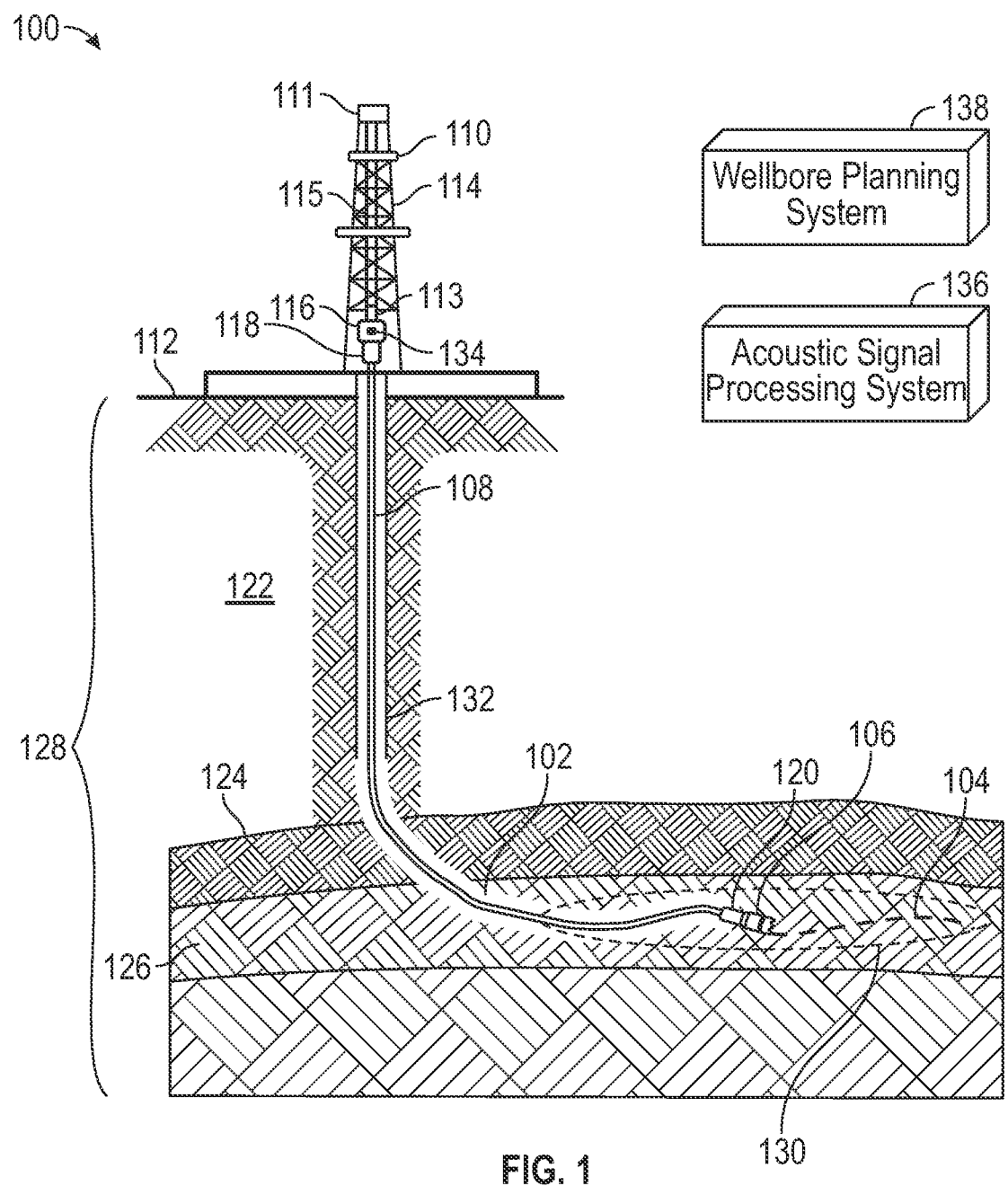
FIG. 1 illustrates a schematic diagram of a well site in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a flow rate" includes reference to one or more of such flow rates.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims may not be introduced, it would be apparent to one of ordinary skill that the subject matter of the dependent claims of one or more embodiments may be combined with other dependent claims.

In the following description of FIGS. 1-11, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In general, embodiments of the disclosure include systems and methods for minimizing environmental noise in acoustic signals acquired for facilitating drilling operations in a wellbore. In the oil and gas industry, operations related to drilling and production in a wellbore involve collecting and processing a vast amount of information about the formation traversed by the wellbore. Information collected while drilling a wellbore may assist a driller in making decisions to optimize the drilling operation, for example, for maintaining or changing the direction to drill (geo-steering). Techniques to measure the conditions at the well's during drilling operations are known as "logging-while drilling" (LWD) techniques. The implementation of LWD techniques while a particular formation is being drilled provides information on physical properties of the formation and the changing conditions of the wellbore.

A formation must present certain physical characteristics to permit the storage and the flow of hydrocarbons. For example, a desired physical characteristic in a geomaterial of a formation is porosity, that is, the presence of voids and spaces in the geomaterial. LWD devices such acoustic sensors may be used to measure the porosity of a formation, because the speed of an acoustic wave propagating through the formation is affected by the porosity of the propagation medium. Acoustic waves are pressure waves generated in a medium when energy is released upon deformation or failure of the material. The acoustic waves may be characterized for example by their amplitude, wavelength, frequency band, phase and energy. When measured and analyzed accurately, acoustic waves may provide useful information regarding the source and the medium of propagation.

Acoustic signal acquisition and processing is a cost-effective technique to provide estimates of the condition of the geomaterial in a wellbore that can be performed without sampling the geomaterial in the formation. Furthermore, acquisition and evaluation of acoustic signals may be done promptly, remotely, and without interrupting the ongoing drilling operations. Techniques of acoustic signal processing have greatly contributed to the progress of the areas of geophysical exploration and prospecting, drilling operations, mineral processing and rock mechanics. However, most of the time, unwanted noise is also detected by the acoustic sensors, for example, the noise generated by the drilling operation of the drilling rig and by other environmental sources at the wellbore. Accordingly, isolating the acoustic waves from the unwanted noises that are also detected by the acoustic sensor may improve the accuracy in characterizing the properties of the geomaterials in a formation, and with it, the efficiency of drilling operations.

FIG. 1 shows a drilling system (100) in accordance with one or more embodiments. As shown in FIG. 1, a wellbore (102) following a wellbore trajectory (104) may be drilled by a drill bit (106) attached by a drillstring (108) to a drilling rig (110) located on the surface (112) of the earth. The drilling rig (110) may include framework, such as a derrick (114) to hold drilling machinery. A crown block (111) may be mounted at the top of the derrick (114), and a traveling block (113) may hang down from the crown block (111) by means of a cable (115) or drilling line. One end of the cable (115) may be connected to a drawworks (not shown), which is a reeling device that may be used to adjust the length of the cable (115) so that the traveling block (113) may move up or down the derrick (114).

A top drive (116) provides clockwise torque via the drive shaft (118) to the drillstring (108) in order to drill the wellbore (102). The drillstring (108) may comprise a plurality of sections of drillpipe attached at the uphole end to the drive shaft (118) and downhole to a bottomhole assembly ("BHA") (120). The BHA (120) may be composed of a plurality of sections of heavier drillpipe and one or more measurement-while-drilling ("MWD") tools configured to measure drilling parameters, such as torque, weight-on-bit, drilling direction, temperature, etc., and one or more logging-while-drilling ("LWD") tools configured to measure parameters of the rock surrounding the wellbore (102), such as electrical resistivity, density, sonic propagation velocities, gamma-ray emission, etc.

The wellbore (102) may traverse a plurality of overburden (122) layers and one or more formations (124) to a reservoir (126) within the subterranean region (128), and specifically to a drilling target (130) within the reservoir (126). The wellbore trajectory (104) may be a curved or a straight trajectory. All or part of the wellbore trajectory (104) may be vertical, and some wellbore trajectory (104) may be deviated or have horizontal sections. One or more portions of the wellbore (102) may be cased with casing (132) in accordance with the wellbore plan.

To start drilling, or "spudding in" the well, the hoisting system lowers the drillstring (108) suspended from the derrick (114) towards the planned surface location of the wellbore (102). An engine, such as an electric motor, may be used to supply power to the top drive (116) to rotate the drillstring (108) through the drive shaft (118). The weight of the drillstring (108) combined with the rotational motion enables the drill bit (106) to bore the wellbore (102).

The drilling system (100) may be disposed at and communicate with other systems in the well environment. The drilling system (100) may control at least a portion of a drilling operation by providing controls to various components of the drilling operation. In one or more embodiments, the drilling system (100) may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus.

While drilling, acoustic waves are generated by the cutting action of the drill bit (106) cutting the rock. Acoustic waves generated while drilling are affected by the lithology of the geomaterials contacted by the drill bit (106) and other operational parameters of the drilling rig (110). In accordance with one or more embodiments, the acoustic waves may be detected by one or more sensors (134). The illustrated locations of the sensors (134) are not intended to be limiting, and sensors (134) could be disposed wherever acoustic waves need to be measured. The sensors (134) may record and transmit, in real-time, sounds from the drill bit (106) cutting action in the form of acoustic signals to an acoustic signal processing system (136). The transmission may be performed wirelessly. Because acoustic waves from the drill bit (106) while drilling are affected by the physical properties of the formation rock (124) and drilling operational parameters, the acoustic signals may be said to contain information describing, at least, the formation (124).

The acoustic signal processing system (136) may receive the acoustic signals and may process the acoustic signals in real time. This may include processing steps such as pre-processing and noise attenuation. Further, the acoustic signal processing system (136) may be used to derive rock physical properties (such as lithology type) based on the processed acoustic signals In some embodiments, the rock physical properties may be used to determine a location of a reservoir (126) (or other subterranean features). Knowledge of the existence and location of the reservoir (126) and other subterranean features may be transferred to a wellbore planning system (138). The wellbore planning system (138) may use information regarding the reservoir (126) location to plan a well, including a wellbore trajectory (104) from the surface (112) of the earth to penetrate the reservoir (126). In addition, to the depth and geographic location of the reservoir (126), the planned wellbore trajectory (104) may be constrained by surface limitations, such as suitable locations for the surface position of the wellhead, i.e., the location of potential or preexisting drilling rig, drilling ships or from a natural or man-made island. In addition to the wellhead and drilling target (130) locations a wellbore trajectory (104) may be influenced by shallow drilling hazards, such as gas pockets, or subterranean water flows, or unstable or metastable fault zones.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. The wellbore plan may be updated during the drilling of the wellbore (102). For example, the wellbore plan may be updated based upon new data about the condition of the drilling equipment, and about the subterranean region (128) through which the wellbore (102) is drilled.

Information regarding the updated wellbore trajectory (104) may be transferred to the drilling system (100) described in FIG. 1. The drilling system (100) may drill the wellbore (102) along the updated wellbore trajectory (104) to access the reservoir (126). In some embodiments, the drilling system (100) may receive the updated wellbore trajectory (104) and drill the wellbore (102) along the updated wellbore trajectory (104) in real time ("geo-steering") to reach one or more drilling targets (130).

Figure 2:
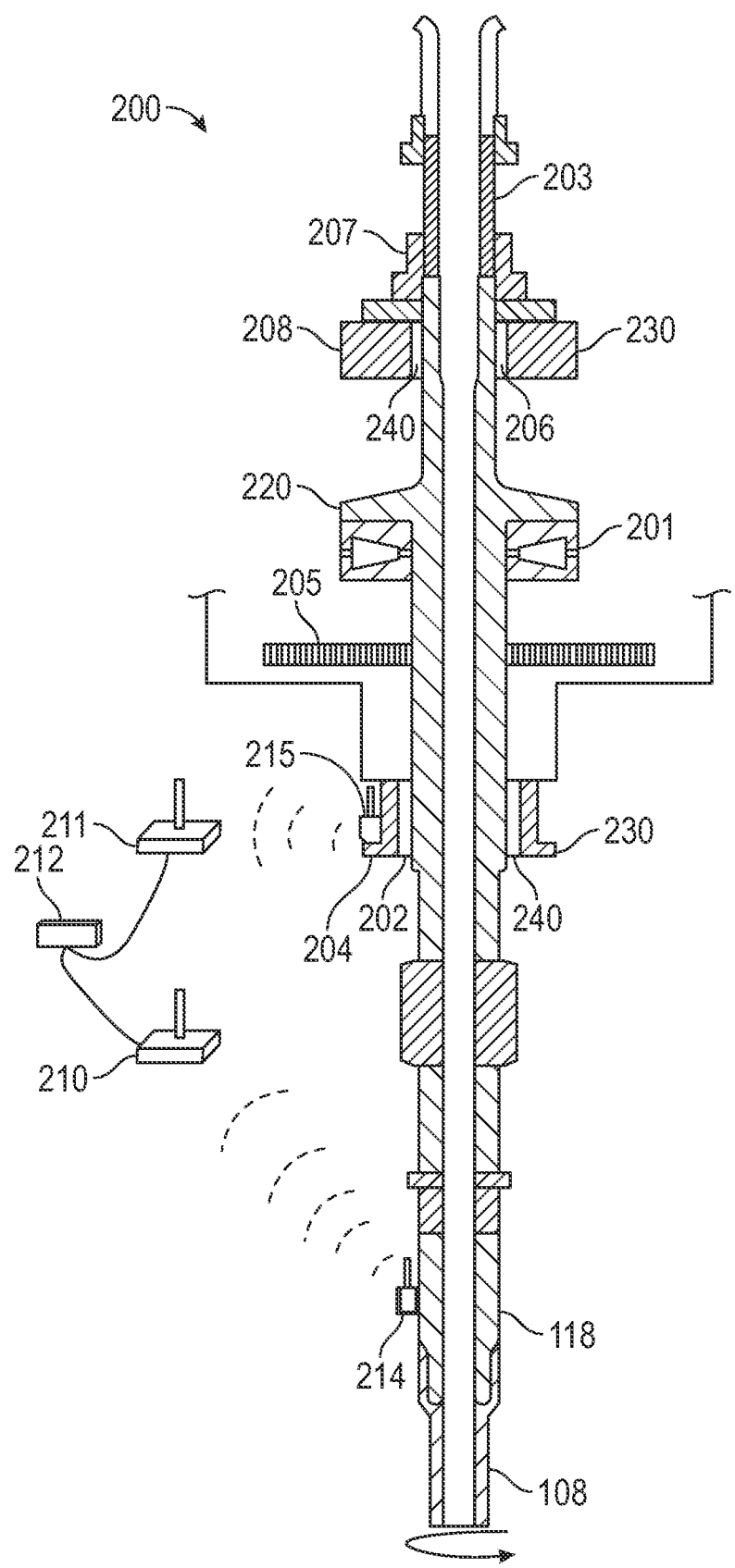
FIG. 2 shows a cut view of a top drive to illustrate several components of the drill rig related to the detection of acoustic waves, in accordance with one or more embodiments.

FIG. 2 shows a cut view of a top drive to illustrate several components of the drill rig related to the detection of acoustic waves, in accordance with one or more embodiments. The top drive (200) may be part of a drilling system, such as the drilling system (100) shown in FIG. 1. Components in FIG. 2 that are similar to or the same as components shown in FIG. 1 have not been redescribed for purposes of readability and have the same structure and description as outlined above. Further, the top drive (200) may have any design known in the art without departing from the scope of the disclosure herein.

In some embodiments, the top drive (200) and other various components of the drilling rig (110) may be suspended by the traveling block (113) through a thrust bearing (201). The drive shaft (118) may be a metal tube between a washpipe (203) and the drillstring (108). The drive shaft (118) may be kept vertical by drive shaft support components (230) such as a rotary manifold (204) and a bearing cup (208). The rotary manifold (204) is stationary relative to the drive shaft (118) during drilling, and may be a stable location to place sensors, making up pipes, breaking out pipes, or drillstring tripping.

The drill bit (106) may be rotated by means of a motor (not shown) through a gear transmission system and a drive shaft rotation assembly (220). The drive shaft rotation assembly (220) may include for example, the drive shaft (118) and the drillstring (108). In the gear transmission system, a large gear (205) is connected to a medial portion of the drive shaft (118), according to some embodiments. At the bottom of the drive shaft (118), the upmost piece of pipe of the drillstring (108) may thread therein. At the top, the drive shaft (118) may be connected to the washpipe (203) by a rotatable packing box (207) which seals the connection between the drive shaft (118) and the washpipe (203). The packing box (207) is screwed on the top of the drive shaft (118) and rotates together with the drive shaft (118). Transfer of rotation and lubrication may be provided to the drive shaft by a lubrication assembly (240) that may include a lower bearing (202) and an upper bearing (206), according to some embodiments.

As illustrated in FIG. 2, the components of an acoustic signal acquisition system interfaced with a top drive (200) may include one or more sensors (214, 215), one or more wireless receivers (210, 211) and an acquisition unit (212), according to some embodiments. Different types of sensors (214, 215) to detect acoustic signals may be used, including for example, accelerometers, measurement microphones, and contact microphones, among others. The sensors (214, 215) may include wireless transmitters to transmit the acoustic signals to the wireless receivers (210, 211).

In some embodiments, one or more sensors (214) may be directly attached to the drive shaft (118) or to an extension of the drive shaft (118), and may rotate together with the drive shaft (118). Although a plurality of sensors (214) may be employed, for illustrative purposes only one sensor (214) attached to the drive shaft (118) is shown in FIG. 2. During drilling, the acoustic waves are generated by the cutting action of the drill bit (106) cutting the rock, propagate along the drillstring (108), then through the drive shaft (118), to be finally detected by the sensor (214). Accordingly, sensors (214) that are directly attached to the drive shaft (118) or to an extension of the drive shaft may detect the sounds of the drill bit (106) during drilling operations without an acoustic barrier and with minimal attenuation, and thus, may acquire high quality acoustic signals.

In some embodiments, one or more sensors (215) may be attached to the rotary manifold (204) of the top drive (200), as shown in FIG. 2. Since the rotary manifold (204) may be separated from the drive shaft (118) by the lower bearing (202), the acoustic waves detected by the sensors (215) may be highly attenuated. Accordingly, the rotary manifold (204) may be a convenient location for sensors (215) to detect a desired level of environmental noise generated during drilling operations.

The acoustic signals may be received and then digitized by the acquisition unit (212) and then transmitted to the acoustic signal processing system (136) to be recorded. The signal may be recorded as a time series, where signal amplitudes are recorded at discrete sample times.

Figure 3:
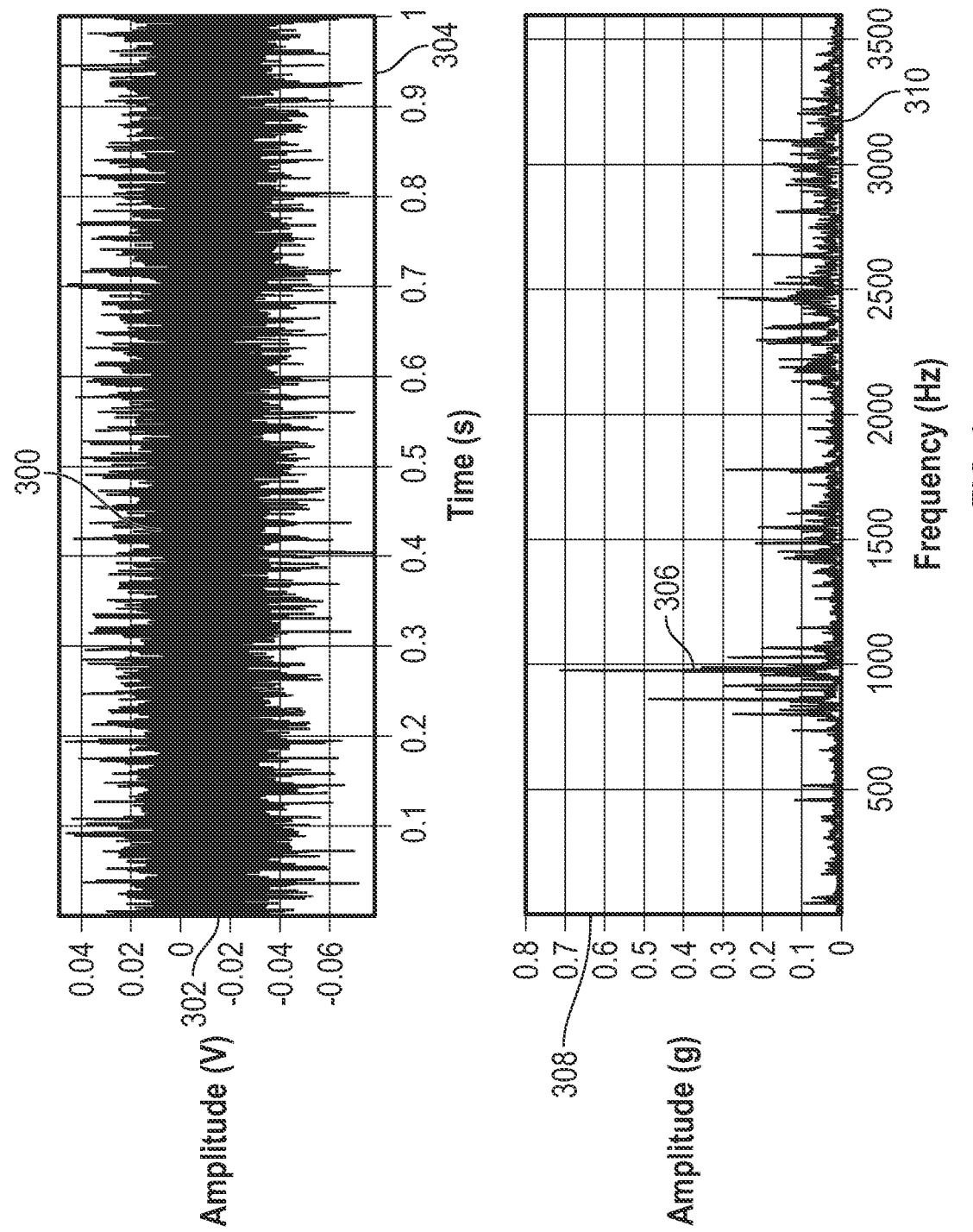
FIG. 3 shows an example acoustic signal recorded over a period of time from a drill bit in accordance with one or more embodiments.

Turning to FIG. 3, FIG. 3 depicts an example acoustic signal (300) recorded over a period of time from a drill bit (106). In FIG. 3, the vertical axis (302) indicates the amplitude of the example acoustic signal (300) and the horizontal axis (304) represents time. Acoustic signals may be transformed by using Fourier Transformation into frequency domain data (or simply called FFT data) for analysis. FIG. 3 also illustrates an example frequency signal (306) obtained by decomposing the example acoustic signal (300) using the Fourier Transform. The vertical axis (308) indicates amplitude of the example frequency signal (306), and the horizontal axis (310) indicates frequency. As seen, the frequency signal (306) provides information on the distribution of energy (for example the most energetic frequencies) of the example acoustic signal (300). Transformation of signals with the Fourier Transform is well known in the art, and thus, this processing step is not further detailed herein.

Returning to the case of recording an acoustic signal generated while drilling, the depth of the drill bit (106) may be tracked as the drill bit (106) traverses the formation (124). An acoustic signal, received and recorded in real-time, may be transformed to a frequency signal. The frequency signal may be analyzed, in real-time, to determine properties of the geomaterials encountered by the drill bit (106) at the current depth of the drill bit (106). As such, analysis of acoustic signals generated by the drill bit (106) allow for real-time lithology identification as the drill bit (106) progresses through the subsurface which may aid to update the wellbore trajectory (104).

Figure 4:
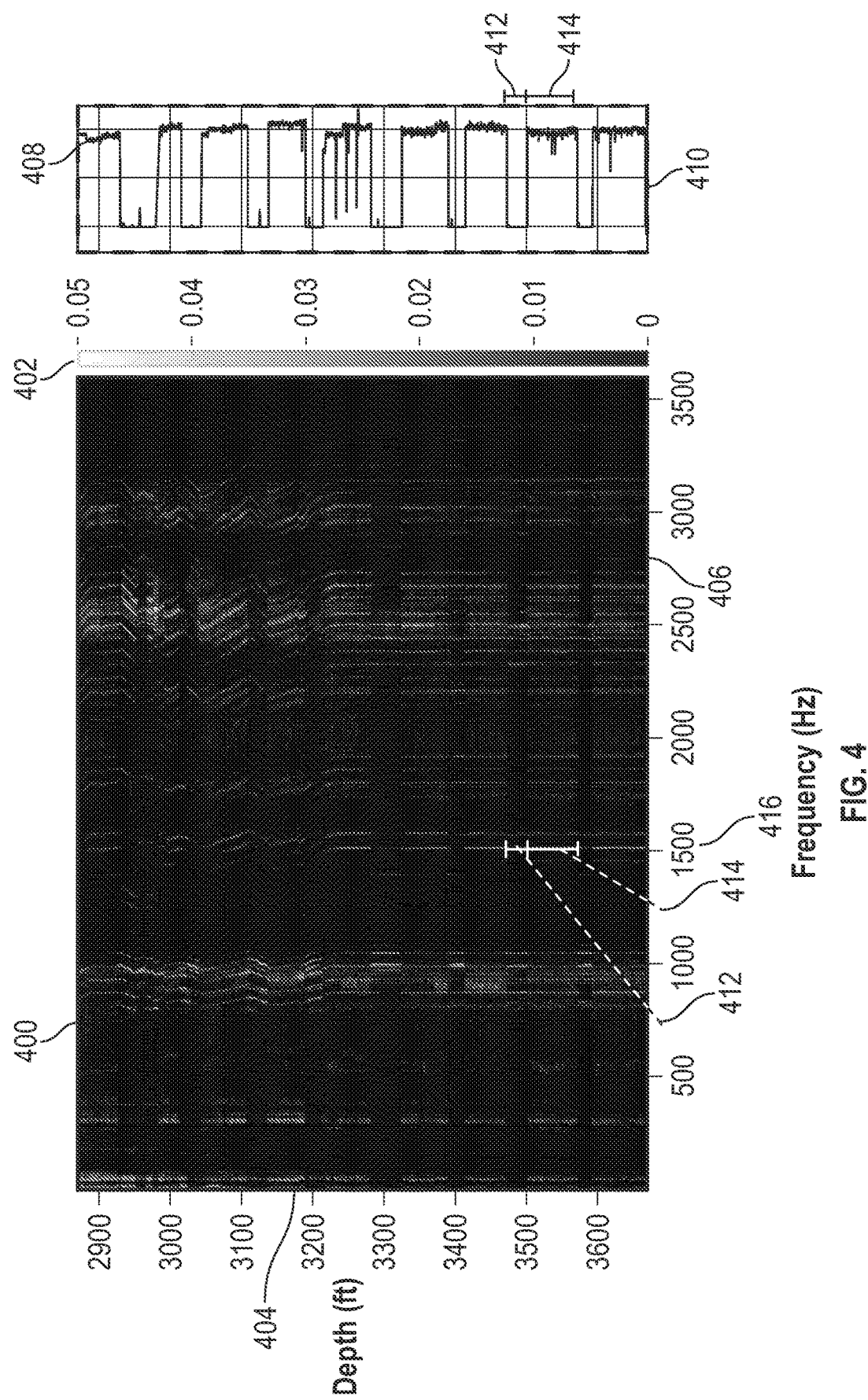
FIG. 4 illustrates a plurality of transformed signals according to depth in accordance with one or more embodiments.

Upon collecting a plurality of acoustic signals generated by a drill bit (106) while drilling, each acoustic signal may be converted to a frequency signal with an associated depth. FIG. 4 depicts a plurality of transformed signals according to depth ("first transformed signal") (400). The amplitude of the first transformed signal (400) is indicated by the vertical scale bar (402), and the horizontal axis (406) indicates frequency. As expected, FIG. 4 demonstrates that the first transformed signal (400) changes as a function of depth (404), indicative of the drill bit (106) encountering a formation (124) with varying properties and/or the drill bit (106) being subject to different environmental or operational parameters. In this case, the operational parameter of drill string rotation rate (408) was recorded simultaneously as the first transformed signal (400). As seen, the drillstring rotation rate (408) varied stepwise between low and high values as the drill bit (106) progressed through the formation (124). Axis (410) indicates the amplitudes of the drillstring rotation rate (408).

FIG. 4 shows how the amplitude of the first transformed signal (400) is affected by the drillstring rotation rate (408). Depth ranges of low/high amplitude of the drillstring rotation rate (408) correspond to the depth ranges of low/high amplitude of the first transformed signal (400). For example, in a depth range (412) just above 3500 ft, both the first transformed signal (400) and the drillstring rotation rate (408) exhibit low amplitudes, whereas in the depth range (414) immediately below 3500 ft, the amplitudes are high. The difference is strongly noticeable at some local peaks of the first transformed signal (400), for example at the frequency (416) of about 1500 Hz. This example then illustrates how the first transformed signal (400) is not only affected by the properties of the geomaterials in contact with the drill bit (106), but also by the drillstring rotation rate (408).

Another example of the influence of operational activities on the acoustic signal is the sounds generated by the top drive (116) during drilling, which may be transmitted via the lower bearing (202) to the drive shaft (118). Indeed, the sounds generated by the top drive (116) do not carry information related to the geomaterials in contact with the drill bit (106) and it can be considered as acoustic noise. In signal processing, noise is considered as contaminating artifacts that are not related to the physical problem of interest, and that should be minimized to enhance the quality of the desired signal.

Figure 5:
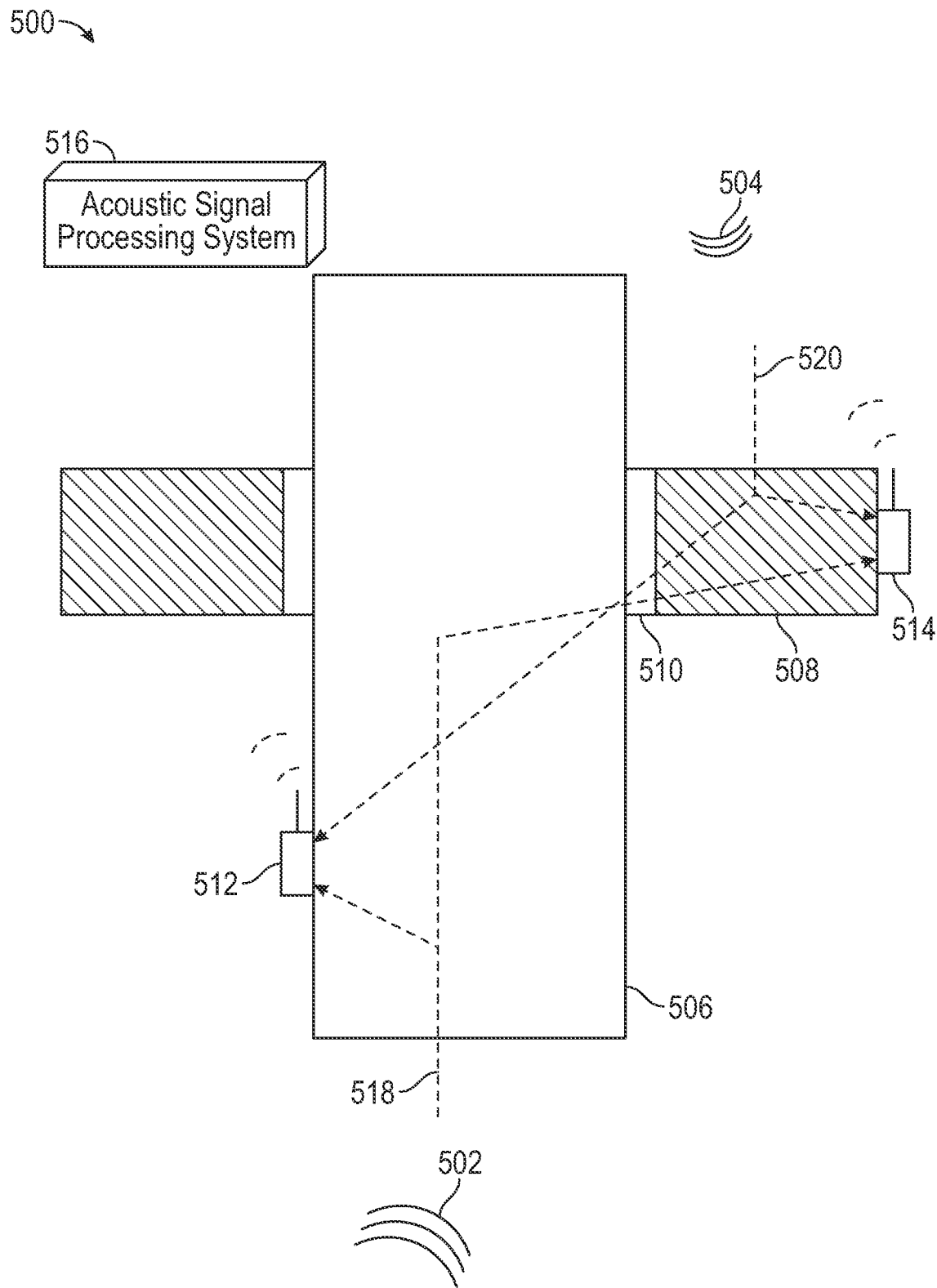
FIG. 5 illustrates a system for minimizing acoustic noise in an acoustic signal in accordance with one or more embodiments.

FIG. 5 illustrates a system (500) for minimizing acoustic noise in an acoustic signal, according to embodiments of the present disclosure. Specifically, the system (500) of FIG. 5 includes an acoustic signal source (502), an acoustic noise source (504), a first acoustic transmission conduit (506), a second acoustic transmission conduit (508), an acoustic attenuation interface (510), a first sensor (512), a second sensor (514), and an acoustic signal processing system (516). The acoustic signal processing system (516) may include an acquisition unit (not shown) with wireless receivers to receive and digitize acoustic signals. The sensors (512, 514) may include wireless transmitters (not shown) to transmit acoustic signals to the wireless receivers.

The acoustic signal source (502) generates energy in the form of acoustic pressure that propagates in all directions through the surrounding medium. The part of the acoustic pressure that propagates through the first acoustic transmission conduit (506) is referred to as "the acoustic signal". An acoustic signal transmission path (518) is shown in FIG. 5, representing the propagation path of the acoustic signal. Since the first acoustic transmission conduit (506) may be connected to the acoustic signal source (502) without any significant acoustic barrier, the acoustic signal may be transmitted through the first acoustic transmission conduit (506) with minimal interferences and/or losses.

On the other hand, the acoustic noise source (504), which also generates energy on the form of propagating acoustic pressure, may be connected to the second acoustic transmission conduit (508) without an acoustic barrier. The part of the energy generated by the acoustic noise source (504) that is transmitted by the second acoustic transmission conduit (508) is referred to as "the acoustic noise". A representative acoustic noise transmission path (520) is also shown in FIG. 5. As seen, the acoustic noise transmission path (520) is typically different to the acoustic signal transmission path (518).

The second acoustic transmission conduit (508) is adjacent to the first acoustic transmission conduit (506) through the acoustic attenuation interface (510). The acoustic attenuation interface (510) prevents partially (i) the transfer of the of acoustic signal from the first acoustic transmission conduit (506) to the second acoustic transmission conduit (508), and (ii) the transfer of acoustic noise from the second acoustic transmission conduit (508) to the first acoustic transmission conduit (506). Thus, when the acoustic signal traverses the acoustic attenuation interface (510) the intensity of the acoustic signal is weakened or attenuated, and the resulting signal is an attenuated acoustic signal. Similarly, when the acoustic noise traverses the acoustic attenuation interface (510) the resulting noise is attenuated acoustic noise.

The two sensors of the system shown in FIG. 5 may be disposed to detect in an efficient manner the acoustic signal and the acoustic noise. The first sensor (512) is directly attached to the first acoustic transmission conduit (506), in order to detect the acoustic signal with minimal losses and interferences, as suggested by the acoustic signal transmission path (518). The acoustic noise is also transmitted by the first acoustic transmission conduit (506) and detected by the first sensor (512). However, as illustrated by the acoustic noise transmission path (520), the noise that arrives to the first sensor (512) is attenuated acoustic noise that has been weakened by the acoustic attenuation interface (510). On the other hand, the second sensor (514) may be attached to the second acoustic transmission conduit (508), to detect the acoustic noise directly and efficiently. According to the acoustic signal transmission path (518) in FIG. 5, the second sensor (514) also detects an attenuated acoustic signal, after the acoustic signal has been weakened when traversing the acoustic attenuation interface (510).

According to the above description of the system (500), the acoustic signal detected by the first sensor (512) may be stronger in intensity than the attenuated acoustic signal detected by the second sensor (514). Regarding the detection of acoustic noise with the system (500), the first sensor (512) may detect an attenuated acoustic noise which is weaker in intensity than the acoustic noise detected by the second sensor (514). In summary, the first sensor (512) may detect a first composite signal composed of the acoustic signal and attenuated acoustic noise. Similarly, the second sensor (514) may detect a second composite signal composed of the acoustic noise and the attenuated acoustic signal.

The sensors may transmit the detected first and second composite signals to the acoustic signal processing system (516) to be recorded and then processed. The acoustic signal processing system (516) may be configured to digitize the first and second composite signals as amplitudes sampled in time, using the same time instants for both signals. In this case, it is said that the digitized first and second composite signals are synchronized.

In some embodiments of the present disclosure, the acoustic signal source (502) may be the cutting action of the drill bit (106) on a geomaterial while drilling, and the acoustic noise source (504) may be the sounds emitted by the top drive (116) during the same drilling operation. Alternatively, the acoustic noise source (504) may be the rotation rate of the drillstring (108). Furthermore, the first acoustic transmission conduit (506) may be a drive shaft rotation assembly (220). In some embodiments, the drive shaft rotation assembly (220) may include the drillstring (108) and the drive shaft (118) of a drilling rig (110). In other embodiments, the drive shaft rotation assembly (220) may include the drillstring (108), the drive shaft (118), and a drive extension of the drive shaft. Another example of a drive shaft rotation assembly (220) includes the drillstring (108), the drive shaft (118), and the packing box (207) of a drilling rig (110). On the other hand, the second acoustic transmission conduit (508) may be a drive shaft support component (230). For example, the drive shaft support component (230) may be a rotary manifold (204), or a bearing cup (208).

In one or more embodiments, the acoustic attenuation interface (510) may include a lubrication assembly (240) of a drive shaft. Since the lubrication assembly (240) may be in contact with the drive shaft rotation assembly (220) on a first side, and with a drive shaft support component (230) on a second side, the lubrication assembly (240) may function as the acoustic attenuation interface (510). As non-limiting examples, the lubrication assembly (240) may include the top drive lower bearing (202), or the top drive upper bearing (206).

Regarding sensors, in some embodiments of the present disclosure the first sensor (512) may be disposed in direct contact with the drive shaft (118), with an extension of the drive shaft (118), or with a packing box (207). Further, the second sensor (514) may be positioned on the rotary manifold (204) or on the bearing cup (208) of the top drive (200).

Figure 6:
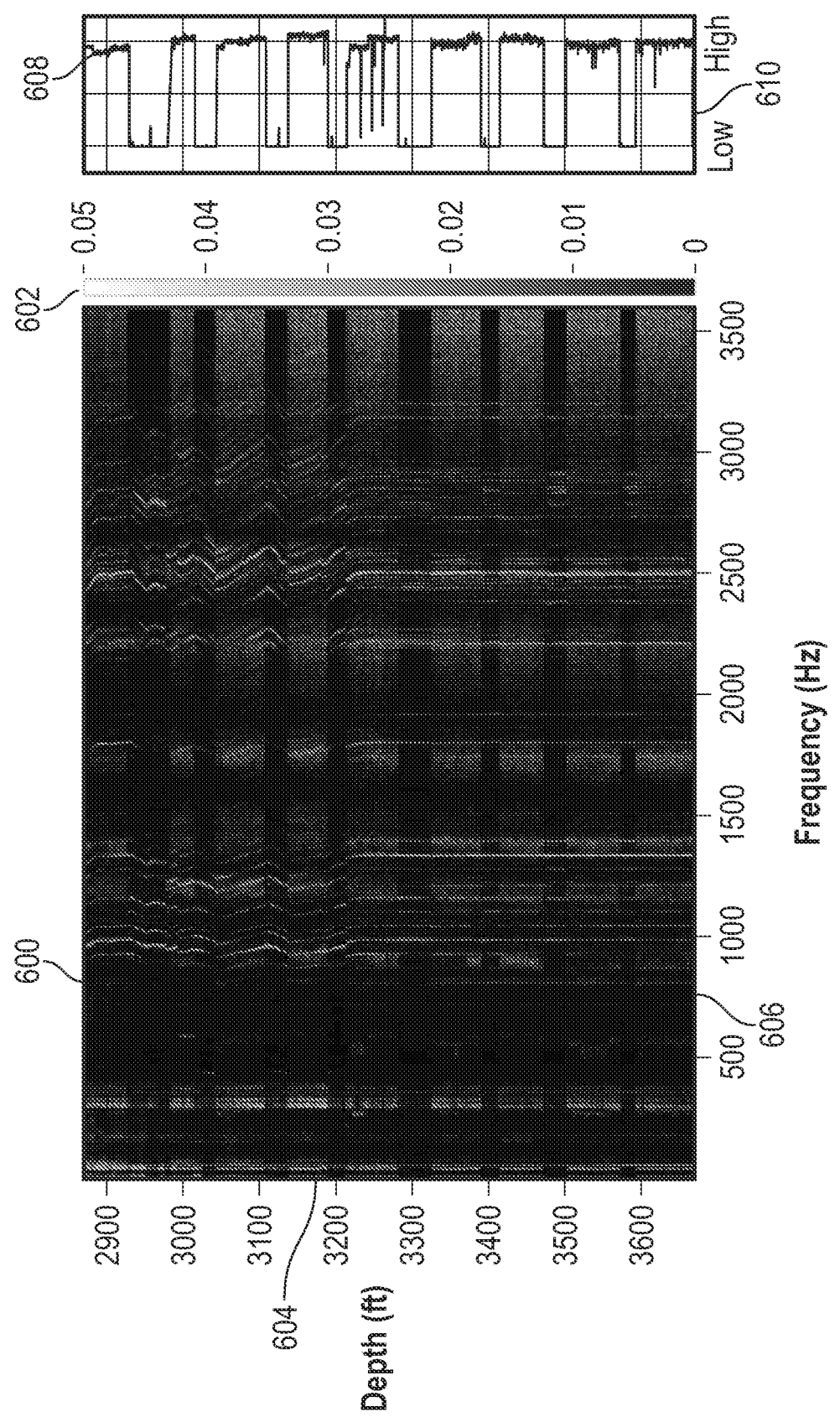
FIG. 6 illustrates an example of a second transformed signal, a signal with a strong noise content, in accordance with one or more embodiments.

An example of a signal detected by the first sensor (512) connected to a drive shaft (118) is the first transformed signal (400) illustrated in FIG. 4. On the other hand, FIG. 6 illustrates an example of a second transformed signal (600), a signal with a strong noise content, detected by the second sensor (514) that is attached to the rotary manifold (204). The amplitude scale (602), the wellbore depth axis (604), and the frequency axis (606) of the second transformed signal of FIG. 6 are in the same ranges as those of the first transformed signal (400) of FIG. 4. Comparison of the two transformed signals shows that even though their distribution of amplitudes with depth and frequency are similar, the second transformed signal (600) detected is more strongly affected by the drillstring rotation rate (608). The variation of amplitude with depth of the second transformed signal (600) is very similar to the step-like variation of the amplitude of the drillstring rotation rate (610), especially at high frequencies.

Figure 7:
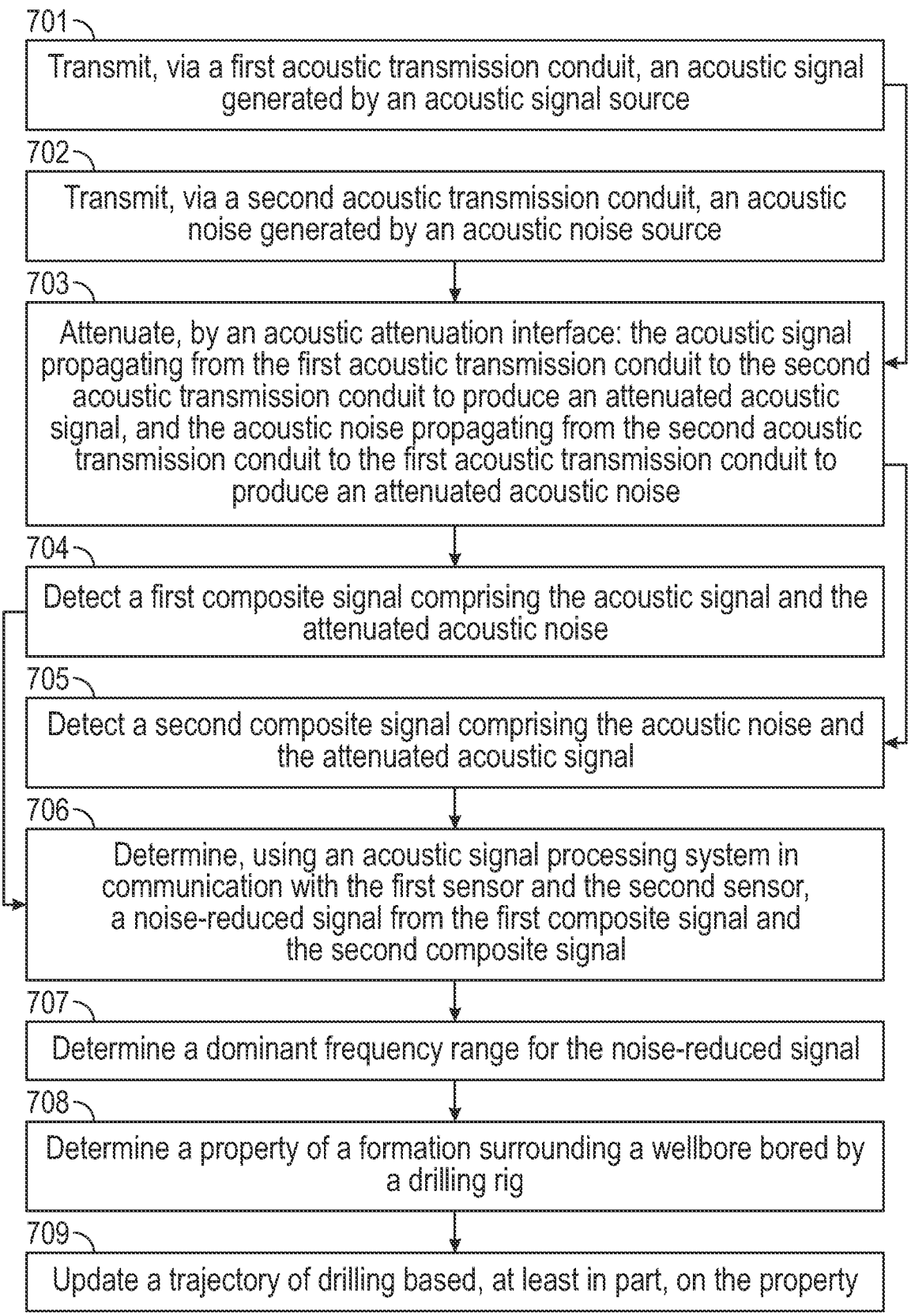
FIG. 7 shows a flowchart in accordance with one or more embodiments.

FIG. 7 shows a flowchart in accordance with one or more embodiments disclosed herein. One or more of the steps in FIG. 7 may be performed by the components of the system (500) of FIG. 5, in particular the first sensor (512) and the second sensor (514) and the acoustic signal processing system (516), discussed above. In one or more embodiments, one or more of the steps shown in FIG. 7 may be omitted, repeated, and/or performed in a different order than the order shown in FIG. 7. Accordingly, the scope of the disclosure should not be considered limited to the specific arrangement of steps shown in FIG. 7.

Referring to FIG. 7, initially in step (701), the acoustic signal generated by an acoustic signal source (502) propagates via a first acoustic transmission conduit (506) that may be connected to the acoustic signal source (502) without a significant acoustic barrier. Similarly, in step (702), acoustic noise generated by an acoustic noise source (504) propagates via a second acoustic transmission conduit (508) that also may be connected to the acoustic noise source (504) without a significant acoustic barrier.

In step (703) the acoustic signal and the acoustic noise propagate, along their own paths, through the acoustic attenuation interface (510) disposed between the first acoustic transmission conduit (506) and the second acoustic transmission conduit (508). The acoustic signal is then attenuated when propagating from the first acoustic transmission conduit (506) to the second acoustic transmission conduit (508). In addition, the acoustic noise is attenuated when propagating from the second acoustic transmission conduit (508) to the first acoustic transmission conduit (506).

In step (704), a first sensor (512) coupled to the first acoustic transmission conduit (506) detects a first composite signal. The first composite signal may include the acoustic signal and the attenuated acoustic noise. Similarly, in step (705), a second sensor (514) is coupled to the second acoustic transmission conduit (508) to detect a second composite signal. The second composite signal may include the acoustic noise and the attenuated acoustic signal.

In step (706) an acoustic signal processing system (516) connected to the first sensor (512) and to the second sensor (514), through an acoustic transmission system and a data acquisition unit, generates a noise-reduced signal from the first composite signal and the second composite signal.

Figure 8:
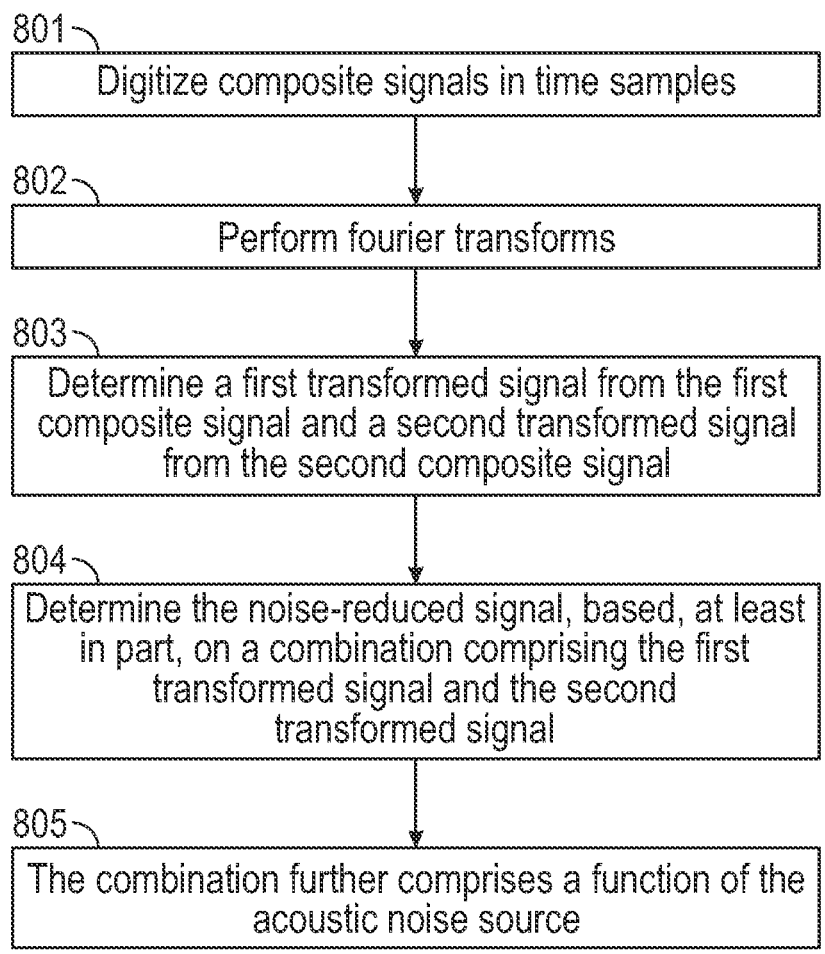
FIG. 8 shows a subset of the flowchart in accordance with one or more embodiments.

Turning to FIG. 8, FIG. 8 provides an example of producing a noise reduced signal, according to one or more embodiments. The following example is for explanatory purposes only and not intended to limit the scope of the disclosed technology. In FIG. 8 the two composite signals may be first digitized in the form of amplitudes that are sampled in time (801), as in the example acoustic signal (300) of FIG. 3. The two signals may also be synchronized. In step (803) the acoustic signal processing system (516) generates a first transformed signal from the first composite signal, and a second transformed signal from the second composite signal. The first transformed signal may be generated by decomposing the first composite signal into a collection of amplitudes sampled in frequency. The decomposition into amplitudes sampled in frequency may be performed for example, by the Fourier Transform, as shown in step (802). The second transformed signal may be also generated using the Fourier Transform. The first and the second composite signals are transformed with the same decomposition steps, the two resulting transformed signals therefore have the same frequency steps.

In step (804), the acoustic signal processing system (516) may determine a noise-reduced signal by a combination that includes the first transformed signal and the second transformed signal. The combination may also include a function of the acoustic noise source (504), as shown in step (805).

For example, the amplitude of the noise-reduced signal may be determined using the following mathematical operation:

$$A_f = A_p - C \cdot A_s, \text{ if } A_p \geq C \cdot A_s$$

$$A_f = 0, \text{ if } A_p < C \cdot A_s \qquad (1)$$

where $A_p$ is the amplitude of the first transformed signal at a certain frequency, $A_s$ is the amplitude of the second transformed signal at the same frequency, and $A_f$ is the amplitude of the resulting noise-reduced signal at the same frequency. The parameter $C = f(E)$ may be the function of the acoustic noise source (504), where E is a measure of an environmental activity. In the example of a drilling rig (110), the function $f(E)$ of the acoustic noise source (504) may have the form of a variation of a drilling parameter with depth. If the acoustic noise source (504) is related to the rotation of the drillstring (108), the parameter C may be expressed as:

$$C = a + b \cdot R \qquad (2)$$

where R is the drillstring rotation rate in rounds per minute (rpm), and a and b are constants. The values the constants a and b may attain depend on the specific configuration of the drilling rig (110).

Turning to FIG. 7, in block (707) of FIG. 7 the acoustic signal processing system (516) may determine a dominant frequency range for the noise-reduced signal. The dominant frequency range may be a frequency range in which the noise from environment activities, i.e., from the noise source (504) is maximally reduced in the noise-reduced signal, and the noise-reduced signal is more closely related to the acoustic signal source (502). Alternatively, the dominant frequency range may be a range of frequencies where the signal-to-noise ratio is above a desired predetermined value. The signal-to noise ratio may be the ratio of signal power to the noise power, often expressed in decibels (dB). For example, a signal-to noise ratio that exceeds 0 dB indicates that the acoustic signal has more intensity than the acoustic noise.

In some embodiments the information carried by the acoustic signal in the dominant frequency range is closely related to the properties of the formation (124) surrounding the wellbore (102). The noise-reduced signal in the dominant frequency range may then be used to determine a property of a formation (124) surrounding a wellbore (102) bored by a drilling rig (110), as shown in step (708). The physical properties may include for example, porosity, water saturation, permeability, a presence of fractures, a lithology type, and a presence of hydrocarbons. Determining the physical properties may include processing the amplitudes of the noise-reduced signal to construct property evaluation models using statistical methods and/or artificial neural network modeling techniques. In real applications, the physical properties may be derived from the noise-reduced signals by using the constructed property evaluation models.

Processing of the acoustic signal to obtain a noise-reduced signal may be performed in real-time, therefore the properties of the geomaterials encountered by the drill bit (106) at the current depth of the drill bit (106) may be evaluated from the noise-reduced signal during drilling operations in real time. As such, real-time property identification as the drill bit (106) progresses through the formation (124) may aid some real time drilling operations, such as geo-steering, casing shoe positioning, etc., wellbore planning system (138) in updating a wellbore trajectory (104), as shown in step (709).

Figure 9:
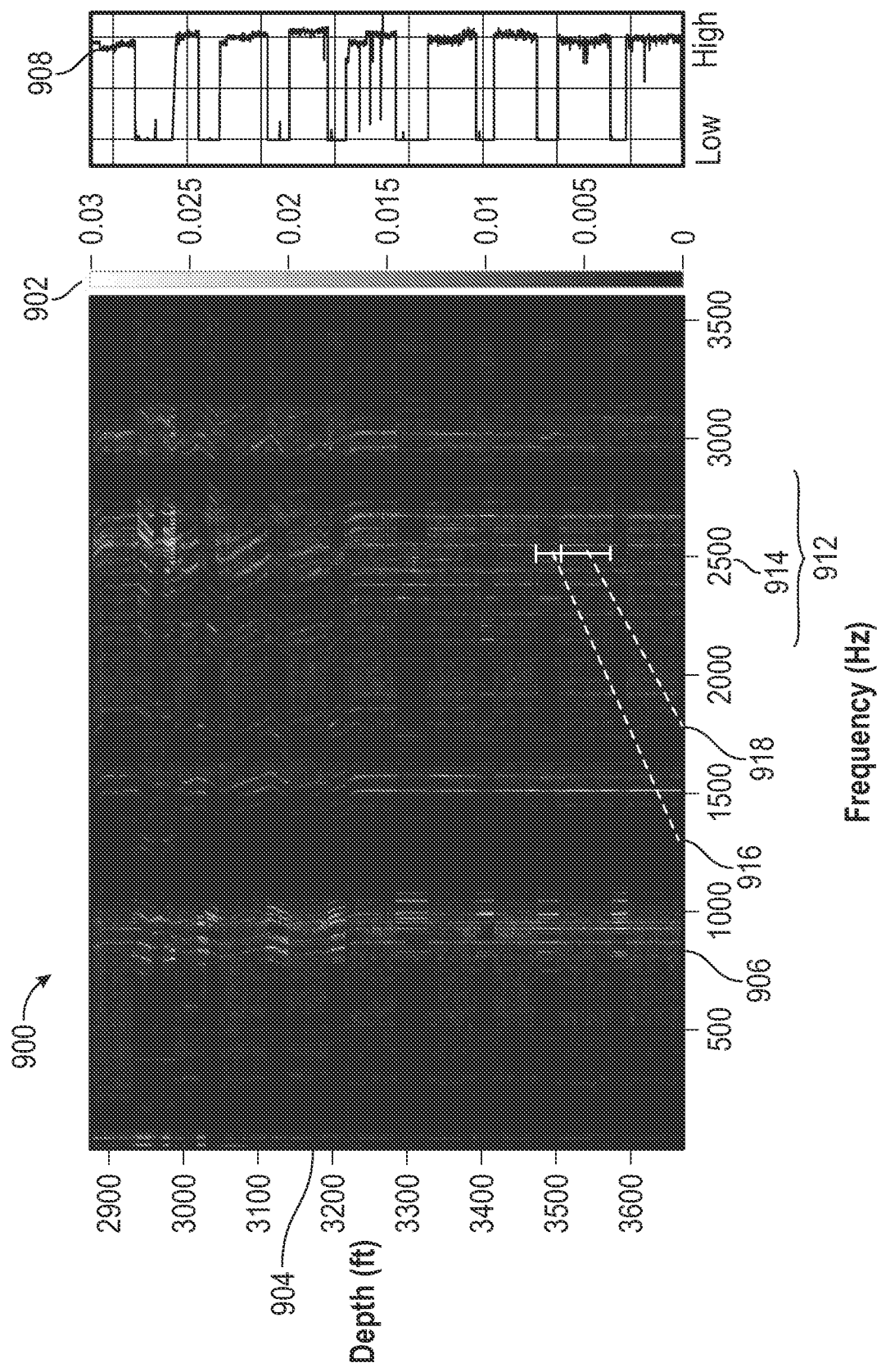
FIG. 9 illustrates a plurality of noise-reduced signals in accordance with one or more embodiments.

FIG. 9 illustrates a noise-reduced signal, according to embodiments of the present disclosure. The scale of the amplitude of the noise-reduced signal (900) is indicated by the color bar (902), the wellbore depth is indicated by the vertical axis (904), and the frequency values are indicated in the horizontal axis (906). Again, as a visual aide for analysis, the variation with depth of the drillstring rotation rate (908) is shown next to the noise-reduced signal (900). They noise-reduced signal is obtained following the method of FIG. 7, and specifically applying Eqs. (1) and (2) to the amplitudes of the first transformed signal (400) and the second transformed signal (600). The environmental activity factor R used in Equation (2) is the drillstring rotation rate (608) show in FIG. 6. Visual inspection of the noise-reduced signal (900) and comparison with the first transformed signal (400) shows that the noise-reduced signal variation with depth is less affected by the drillstring rotation rate (908).

Furthermore, in FIG. 9 a dominant frequency range (912) may be identified, in which the noise due to the drillstring rotation rate has been significantly reduced. In the dominant frequency range (912), which in FIG. 9 goes from 2150 to 2800 Hz, the amplitudes of the noise-reduced signal are similar regardless of whether the wellbore depth corresponds to a low or high value of the drillstring rotation rate (908). For example, at some frequencies about 2500 Hz (914), the amplitudes at the range of low drillstring rotation rate (916) and at the range of high drillstring rotation rate (918) are more similar for the noise-reduced signal (900) than for the first transformed signal (400).

Furthermore, the noise-reduced signal (900) within the dominant frequency range (912) may be used directly to derive some required physical information, such as lithology properties of the formation under drilling. Alternatively, the noise-reduced signal (900) within the dominant frequency range (912) may be used to derive some properties of transformed signals, such as the apparent power. The apparent power of an acoustic signal may be expressed in the following form:

$$P_a = \sum_{i=1}^{n} A_i^2 f_i^2 \tag{3}$$

where $P_a$ is the apparent power of a transformed signal, n is the number of frequency samples of the transformed signal, $f_i$ is the frequency in Hz of the i-th sample of the transformed signal, and $A_i$ is the amplitude of the i-th sample of the transformed signal.

Figure 10:
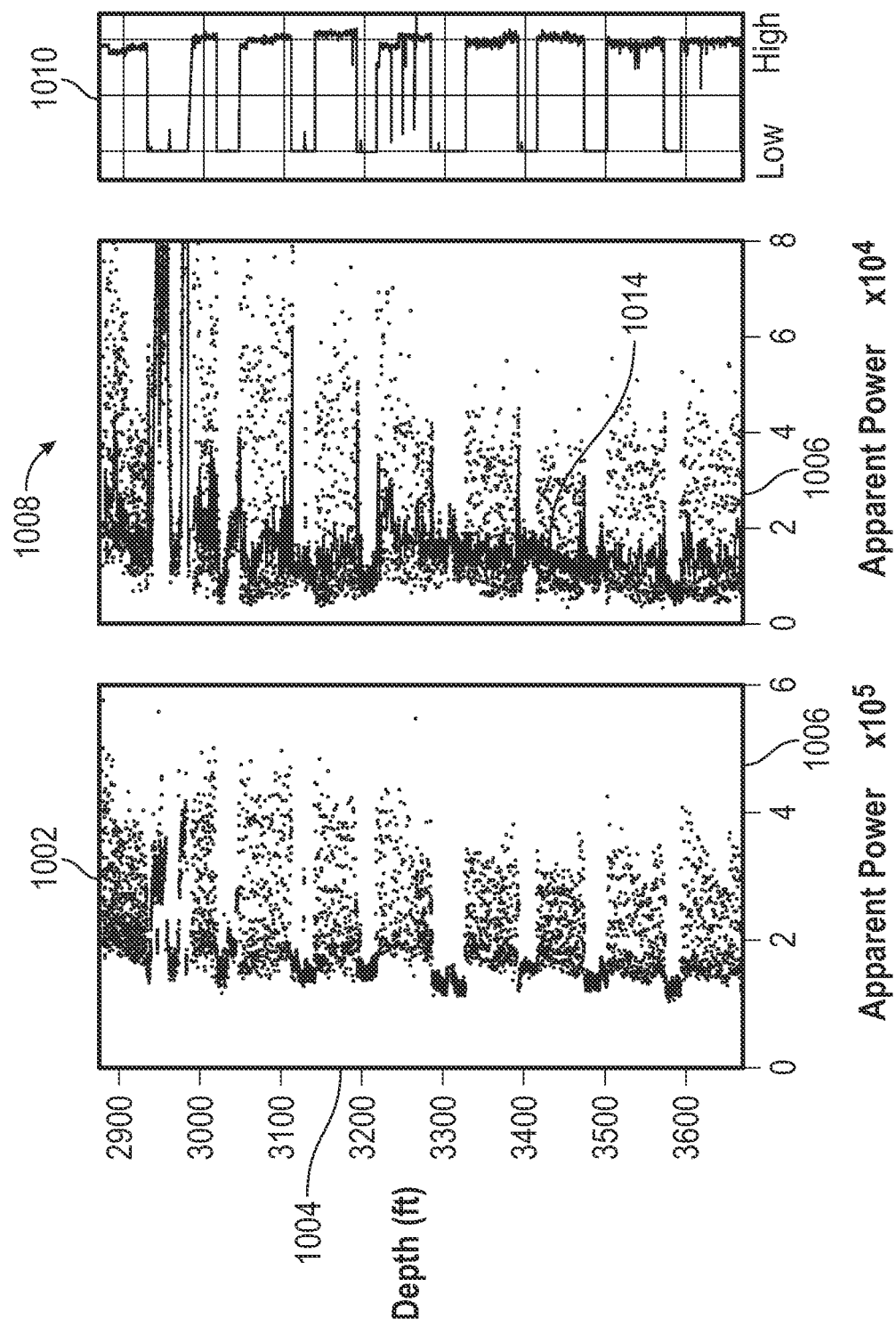
FIG. 10 illustrates the apparent power for a transformed signal and for a noise-reduced signal in accordance with one or more embodiments.

FIG. 10 illustrates the apparent power for the first transformed signal and for a noise-reduced signal, according to embodiments of the present disclosure. The amplitudes of apparent power are indicated by the horizontal axes (1006), and the vertical axis (1004) indicates the wellbore depth. The plot on the left illustrates the apparent power of the first transformed signal (1002) whereas the central plot corresponds to the apparent power of the noise-reduced signal (1008). For purposes of comparison, the drillstring rotation rate (1010) is plotted next to the plots of apparent power. Comparing the plots of apparent power it is clear that the apparent power of the first transformed signal (1002) is highly affected by the drillstring rotation rate (1010), if no noise-reduction processing is performed.

The apparent power of the noise-reduced signal (1008) shown in FIG. 10 was obtained considering the noise-reduced signal (900) only within the dominant frequency range (912). FIG. 10 illustrates that the resulting apparent power for the noise-reduced signal (1008) shows significant less variation with the drillstring rotation rate (1010). This is further illustrated by the continuous line representing the moving median (1014) of the apparent power of the noise-reduced signal (1008). Therefore, the lithological properties derived using the apparent power of the noise-reduced signal (1008) may contain less errors due to environmental noise.

Figure 11:
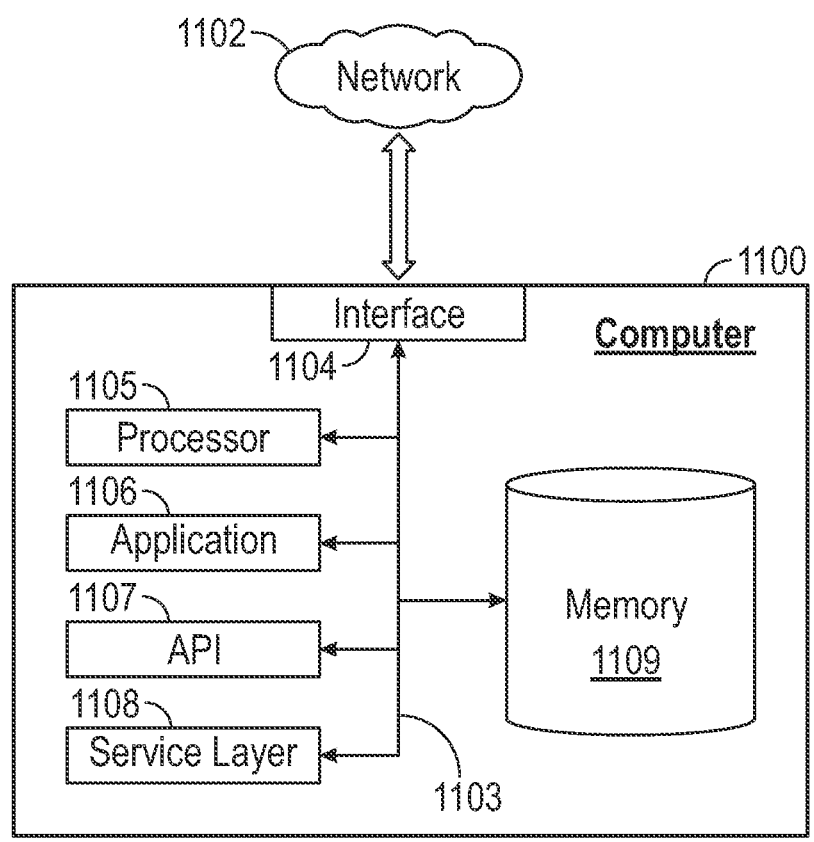
FIG. 11 illustrates a block diagram of a computer system in accordance with one or more embodiments.

In some embodiments the acoustic signal processing system (136) and/or the wellbore planning system (138) may include a computer system. FIG. 11 is a block diagram of a computer system (1100) used to provide computational functionalities associated with described algorithms, methods, functions, processes, flows, and procedures as described in the instant disclosure, according to an implementation. The illustrated computer (1100) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1100) may include a computer that includes an input device, such as a keypad, keyboard, touch screen, or other device that can accept user information, and an output device that conveys information associated with the operation of the computer (1100), including digital data, visual, or audio information (or a combination of information), or a GUI.

The computer (1100) can serve in a role as a client, network component, a server, a database or other persistency, or any other component (or a combination of roles) of a computer system for performing the subject matter described in the instant disclosure. The illustrated computer (1100) is communicably coupled with a network (1102). In some implementations, one or more components of the computer (1100) may be configured to operate within environments, including cloud-computing-based, local, global, or other environment (or a combination of environments).

At a high level, the computer (1100) is an electronic computing device operable to receive, transmit, process, store, or manage data and information associated with the described subject matter. According to some implementations, the computer (1100) may also include or be communicably coupled with an application server, e-mail server, web server, caching server, streaming data server, business intelligence (BI) server, or other server (or a combination of servers).

The computer (1100) can receive requests over network (1102) from a client application (for example, executing on another computer (1100)) and responding to the received requests by processing the said requests in an appropriate software application. In addition, requests may also be sent to the computer (1100) from internal users (for example, from a command console or by other appropriate access method), external or third-parties, other automated applications, as well as any other appropriate entities, individuals, systems, or computers.

Each of the components of the computer (1100) can communicate using a system bus (1103). In some implementations, any or all of the components of the computer (1100), both hardware or software (or a combination of hardware and software), may interface with each other or the interface (1104) (or a combination of both) over the system bus (1103) using an application programming interface (API) (1107) or a service layer (1108) (or a combination of the API (1107) and service layer (1108). The API (1107) may include specifications for routines, data structures, and object classes. The API (1107) may be either computer-language independent or dependent and refer to a complete interface, a single function, or even a set of APIs. The service layer (1108) provides software services to the computer (1100) or other components (whether or not illustrated) that are communicably coupled to the computer (1100). The functionality of the computer (1100) may be accessible for all service consumers using this service layer (1108). Software services, such as those provided by the service layer (1108), provide reusable, defined business functionalities through a defined interface. For example, the interface may be software written in JAVA, C++, or other suitable language providing data in extensible markup language (XML) format or other suitable format. While illustrated as an integrated component of the computer (1100), alternative implementations may illustrate the API (1107) or the service layer (1108) as stand-alone components in relation to other components of the computer (1100) or other components (whether or not illustrated) that are communicably coupled to the computer (1100). Moreover, any or all parts of the API (1107) or the service layer (1108) may be implemented as child or sub-modules of another software module, enterprise application, or hardware module without departing from the scope of this disclosure.

The computer (1100) includes an interface (1104). Although illustrated as a single interface (1104) in FIG. 10, two or more interfaces (1104) may be used according to particular needs, desires, or particular implementations of the computer (1100). The interface (1104) is used by the computer (1100) for communicating with other systems in a distributed environment that are connected to the network (1102). Generally, the interface (1104) includes logic encoded in software or hardware (or a combination of software and hardware) and operable to communicate with the network (1102). More specifically, the interface (1104) may include software supporting one or more communication protocols associated with communications such that the network (1102) or interface's hardware is operable to communicate physical signals within and outside of the illustrated computer (1100).

The computer (1100) includes at least one computer processor (1105). Although illustrated as a single computer processor (1105) in FIG. 11, two or more processors may be used according to particular needs, desires, or particular implementations of the computer (1100). Generally, the computer processor (1105) executes instructions and manipulates data to perform the operations of the computer (1100) and any algorithms, methods, functions, processes, flows, and procedures as described in the instant disclosure.

The computer (1100) also includes a memory (1109) that holds data for the computer (1100) or other components (or a combination of both) that may be connected to the network (1102). For example, memory (1109) may be a database storing data consistent with this disclosure. Although illustrated as a single memory (1109) in FIG. 10, two or more memories may be used according to particular needs, desires, or particular implementations of the computer (1100) and the described functionality. While memory (1109) is illustrated as an integral component of the computer (1100), in alternative implementations, memory (1109) may be external to the computer (1100).

The application (1106) is an algorithmic software engine providing functionality according to particular needs, desires, or particular implementations of the computer (1100), particularly with respect to functionality described in this disclosure. For example, application (1106) can serve as one or more components, modules, applications, etc. Further, although illustrated as a single application (1106), the application (1106) may be implemented as multiple applications (1106) on the computer (1100). In addition, although illustrated as integral to the computer (1100), in alternative implementations, the application (1106) may be external to the computer (1100).

There may be any number of computers (1100) associated with, or external to, a computer system containing computer (1100), each computer (1100) communicating over network (1102). Further, the term "client," "user," and other appropriate terminology may be used interchangeably as appropriate without departing from the scope of this disclosure. Moreover, this disclosure contemplates that many users may use one computer (1100), or that one user may use multiple computers (1100).

In some embodiments, the computer (1100) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A system comprising:
    an acoustic attenuation interface disposed between a first acoustic transmission conduit and a second acoustic transmission conduit, wherein the acoustic attenuation interface comprises a lubrication assembly of a drive shaft;
    an acoustic signal source that generates an acoustic signal, acoustically coupled to the first acoustic transmission conduit;
    an acoustic noise source that generates an acoustic noise, acoustically coupled to the second acoustic transmission conduit;
    a first sensor coupled to the first acoustic transmission conduit, wherein the first sensor is configured to detect a first composite signal comprising the acoustic signal after transmission through at least a portion of the first acoustic transmission conduit and an attenuated acoustic noise comprising the acoustic noise after transmission through at least a portion of the second acoustic transmission conduit and attenuated by the acoustic attenuation interface;
    a second sensor coupled to the second acoustic transmission conduit, wherein the second sensor is configured to detect a second composite signal comprising the acoustic signal after transmission through at least a portion of the first acoustic transmission conduit and attenuated by the acoustic attenuation interface and the acoustic noise after transmission through at least a portion of the second acoustic transmission conduit; and an acoustic signal processing system, in communication with the first sensor and the second sensor, configured to determine a noise-reduced signal from the first composite signal and the second composite signal.

2. The system of claim 1, wherein the acoustic signal processing system is further configured to determine the noise-reduced signal by:

determining a first transformed signal from the first composite signal and a second transformed signal from the second composite signal; and determining the noise-reduced signal based, at least in part, on a combination comprising the first transformed signal and the second transformed signal.

3. The system of claim 1, wherein the first acoustic transmission conduit comprises a drive shaft rotation assembly of a drilling rig.

4. The system of claim 1, wherein the second acoustic transmission conduit comprises a drive shaft support component.

5. The system of claim 1, wherein the acoustic signal source comprises a drill bit in contact with a wellbore.

6. The system of claim 2, wherein the combination further comprises a function of the acoustic noise source.

7. The system of claim 1, wherein the acoustic signal processing system is further configured to determine a property of a formation surrounding a wellbore bored by a drilling rig based, at least in part, on the noise-reduced signal.

8. The system of claim 7, further comprising a wellbore planning system to update a wellbore trajectory based, at least in part, on the property.

9. The system of claim 8, further comprising a drilling system to drill a portion of the wellbore guided by the updated wellbore trajectory.

10. A method comprising:

transmitting, via a first acoustic transmission conduit, an acoustic signal generated by an acoustic signal source;

transmitting, via a second acoustic transmission conduit, an acoustic noise generated by an acoustic noise source;

attenuating, by an acoustic attenuation interface disposed between the first acoustic transmission conduit and the second acoustic transmission conduit, wherein the acoustic attenuation interface comprises a lubrication assembly of a drive shaft:

the acoustic signal propagating from the first acoustic transmission conduit to the second acoustic transmission conduit to produce an attenuated acoustic signal, and the acoustic noise propagating from the second acoustic transmission conduit to the first acoustic transmission conduit to produce an attenuated acoustic noise;

detecting a first composite signal, using a first sensor coupled to the first acoustic transmission conduit, wherein the first composite signal comprises the acoustic signal and the attenuated acoustic noise;

detecting a second composite signal, using a second sensor coupled to the second acoustic transmission conduit, wherein the second composite signal comprises the acoustic noise and the attenuated acoustic signal; and determining, using an acoustic signal processing system in communication with the first sensor and the second sensor, a noise-reduced signal from the first composite signal and the second composite signal.

11. The method of claim 10, wherein determining the noise-reduced signal with an acoustic signal processing system comprises:

determining a first transformed signal from the first composite signal and a second transformed signal from the second composite signal; and determining the noise-reduced signal based, at least in part, on a combination comprising the first transformed signal and the second transformed signal.

12. The method of claim 10, wherein the first acoustic transmission conduit comprises a drive shaft rotation assembly.

13. The method of claim 10, wherein the second acoustic transmission conduit comprises a drive shaft support component.

14. The method of claim 10, wherein the acoustic signal source comprises a drill bit in contact with a wellbore.

15. The method of claim 11, wherein the combination further comprises a function of the acoustic noise source.

16. The method of claim 10, further comprising determining, from the noise-reduced signal, a dominant frequency range for the noise-reduced signal.

17. The method of claim 10, further comprising determining, using the acoustic signal processing system, a property of a formation surrounding a wellbore bored by a drilling system based, at least in part, on the noise-reduced signal.

18. The method of claim 17, further comprising:

updating, using a wellbore planning system, a wellbore trajectory based, at least in part, on the property; and drilling, using the drilling system, a portion of the wellbore guided by the updated wellbore trajectory.

\* \* \* \* \*